US012447747B2

(12) United States Patent
Okuno

(10) Patent No.: US 12,447,747 B2
(45) Date of Patent: Oct. 21, 2025

(54) ADHERING INK ABSORPTION MECHANISM FOR WIPER CLEANER

(71) Applicant: Roland DG Corporation, Hamamatsu (JP)

(72) Inventor: Hiroshi Okuno, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 181 days.

(21) Appl. No.: 18/243,712

(22) Filed: Sep. 8, 2023

(65) Prior Publication Data

US 2024/0165956 A1 May 23, 2024

(30) Foreign Application Priority Data

Nov. 22, 2022 (JP) ................................ 2022-186737

(51) Int. Cl.
*B41J 2/165* (2006.01)

(52) U.S. Cl.
CPC ................................ *B41J 2/16541* (2013.01)

(58) Field of Classification Search
CPC .......................... B41J 2/16541; B41J 2/16538
See application file for complete search history.

(56) References Cited

FOREIGN PATENT DOCUMENTS

| | | | | | |
|---|---|---|---|---|---|
| CN | 1676337 | A | * 10/2005 | .......... | B41J 2/16538 |
| CN | 100579783 | C | * 1/2010 | .......... | B41J 2/16532 |
| JP | 2020-116851 | A | 8/2020 | | |
| JP | 2020-131609 | A | 8/2020 | | |
| WO | WO-2023139748 | A1 | * 7/2023 | | |

* cited by examiner

*Primary Examiner* — Sharon Polk
(74) *Attorney, Agent, or Firm* — Keating & Bennett, LLP

(57) ABSTRACT

An adhering ink absorption mechanism for a wiper cleaner that facilitates mounting of an ink absorber and replacement of the ink absorber, includes an ink absorber to absorb ink adhering to a wiper by being brought into contact with the wiper, and an ink absorber supporting portion to support the ink absorber at an upper position of the wiper in a state where a contact region with the wiper is released to enable the wiper to be brought into contact with the ink absorber from below by a lifting operation. The ink absorber has a flat plate shape, and includes a placed portion placed on and supported by the ink absorber supporting portion, and an extension region portion bent at an edge of the placed portion and extending downward.

6 Claims, 9 Drawing Sheets

RIGHT-LEFT DIRECTION

ADHERING INK ABSORPTION MECHANISM FOR WIPER CLEANER

CROSS REFERENCE TO RELATED APPLICATIONS

This application claims the benefit of priority to Japanese Patent Application No. 2022-186737 filed on Nov. 22, 2022. The entire contents of this application are hereby incorporated herein by reference.

BACKGROUND OF THE INVENTION

1. Field of the Invention

The present invention relates to an adhering ink absorption mechanism for a wiper cleaner, especially, to an adhering ink absorption mechanism for a wiper cleaner to absorb ink adhering to a wiper used to wipe a printer head.

2. Description of the Related Art

An inkjet printer generally includes a printer head including ejection ports (nozzles) to eject ink on a lower surface, and eject the ink onto an upper surface of a sheet-like medium (printing medium) disposed below the printer head to perform printing. To perform high-precision printing, a state of the ink at the ejection ports, i.e., a so-called nozzle meniscus (ink liquid level), is important. For example, when unnecessary ink droplets adhere to the ejection ports, flight deflection and landing deviation of the ejected ink droplets, shape defects of ink dots after landing, and the like occur. As a result, image quality may be deteriorated by defects of the nozzle meniscus. Accordingly, in the inkjet printer, an ejection surface of a head is wiped by a wiper in order, for example, to adjust the nozzle meniscus and to clean the ejection surface of the head.

The ejection surface of the head is wiped by the wiper in such a manner that, for example, a wiper including a blade shape that is elongated in a direction intersecting a scanning direction of the head (carriage) is installed, the ejection surface of the head is brought into contact with an upper surface or an upper edge of the wiper by scanning operation of the head, vertical operation of the wiper, and the like, and accordingly adhering ink is wiped. The ink adheres to the upper surface and an upper portion of the wiper having performed the wiping. If the wiper in that state wipes the ejection surface again, the ink adhering to the wiper returns to the ejection surface. Therefore, an ink absorber such as a sponge is brought into contact with the upper surface or the upper portion of the wiper, and the adhering ink is absorbed by the ink absorber to remove the ink remaining on the wiper.

Japanese Patent Laid-Open No. 2020-116851 discloses a wiper cleaner for absorbing ink adhering to a wiper by an ink absorber. The ink absorber is held by a plate and mounted on a cleaner holder, and the plate is detachably provided on the cleaner holder. The old ink absorber is replaced with a new ink absorber by drawing out the plate from the cleaner holder.

In the wiper cleaner disclosed in Japanese Patent Laid-Open No. 2020-116851, a size of the usable ink absorber is less than or equal to a size of the cleaner holder because of its structure. Accordingly, the cleaner holder disclosed in Japanese Patent Laid-Open No. 2020-116851 has an issue that it is difficult to increase a volume of the ink absorber to reduce a replacement frequency of the ink absorber.

SUMMARY OF THE INVENTION

Preferred embodiments of the present invention have been conceived of and developed in consideration of the above-described issue and are directed to adhering ink absorption mechanisms for wiper cleaners, each of which facilitates mounting of an ink absorber having a large volume and replacement of the ink absorber.

An adhering ink absorption mechanism for a wiper cleaner according to a preferred embodiment of the present invention includes an ink absorber to absorb ink adhering to a wiper by being brought into contact with the wiper, and an ink absorber supporting portion to support the ink absorber at an upper position of the wiper in a state where a contact region with the wiper is released to enable the wiper to be brought into contact with the ink absorber from below by a lifting operation, wherein the ink absorber has a flat plate shape, and includes a placed portion placed on and supported by the ink absorber supporting portion, and an extension region portion bent at an edge of the placed portion and extending downward.

According to the configuration, the flat plate-shaped ink absorber includes the extension region portion bent at the edge of the placed portion supported by the ink absorber supporting portion and extending downward. This makes it possible to increase the volume of the ink absorber. In other words, the ink absorber can be set to an optional size without being limited to the size of the ink absorber supporting portion. This makes it possible to reduce the replacement frequency of the ink absorber. In addition, since the ink absorber is placed on and supported by the ink absorber supporting portion, the ink absorber can be easily attached and easily replaced.

According to an adhering ink absorption mechanism for a wiper cleaner of a preferred embodiment of the present invention, the volume of the ink absorber absorbing the adhering ink can be increased, and the replacement frequency of the ink absorber can be reduced because of an increase in an absorption amount. Further, the ink absorber can be installed only by placing the placed portion on the ink absorber supporting portion in a positioned state, and the ink absorber is easily replaceable. Accordingly, it is possible to contribute to improvement in an operation rate of the inkjet printer mounted with the adhering ink absorption mechanism for a wiper cleaner according to a preferred embodiment of the present invention.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily perceived as the same becomes better understood by reference to the following detailed description when considered in connection with the accompanying drawings.

DETAILED DESCRIPTION OF THE PREFERRED EMBODIMENTS

Other features, characteristics, aspects, elements, etc. of the present invention will become apparent from the following description of preferred embodiments thereof, which are explained for illustration of preferred embodiments of the present invention and are not intended to be limiting thereof.

Figure 1A:
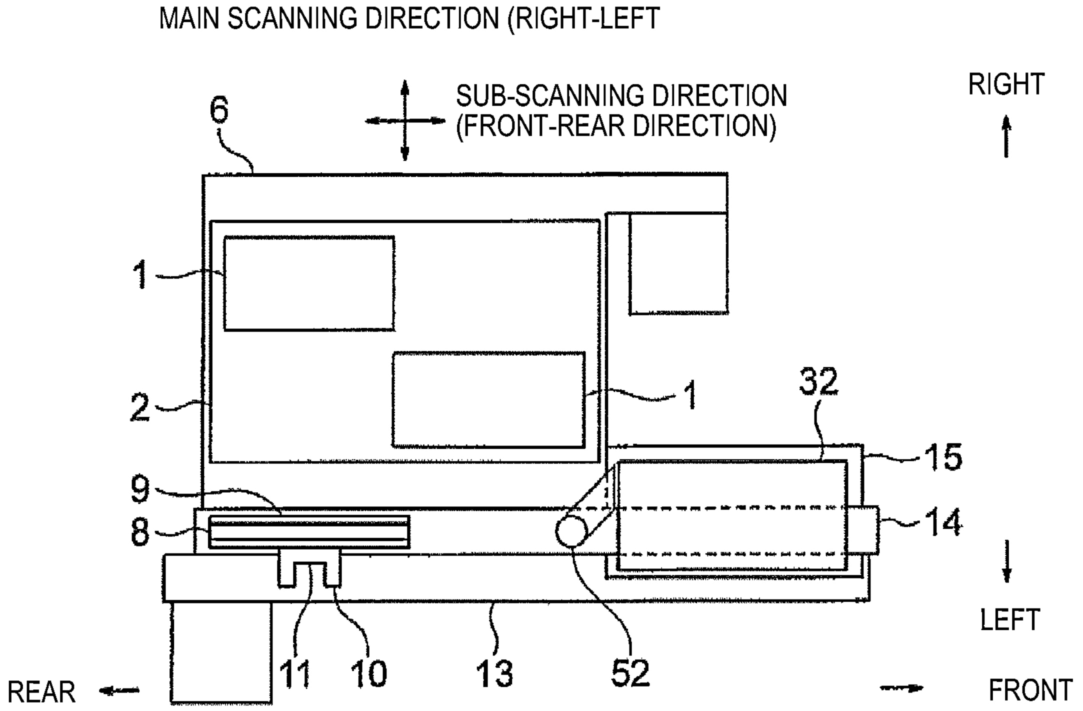
FIGS. 1A and 1B are schematic configuration diagrams illustrating layout of main units of an inkjet printer mounted with an adhering ink absorption mechanism for a wiper cleaner according to a preferred embodiment of the present invention.
Figure 1B:
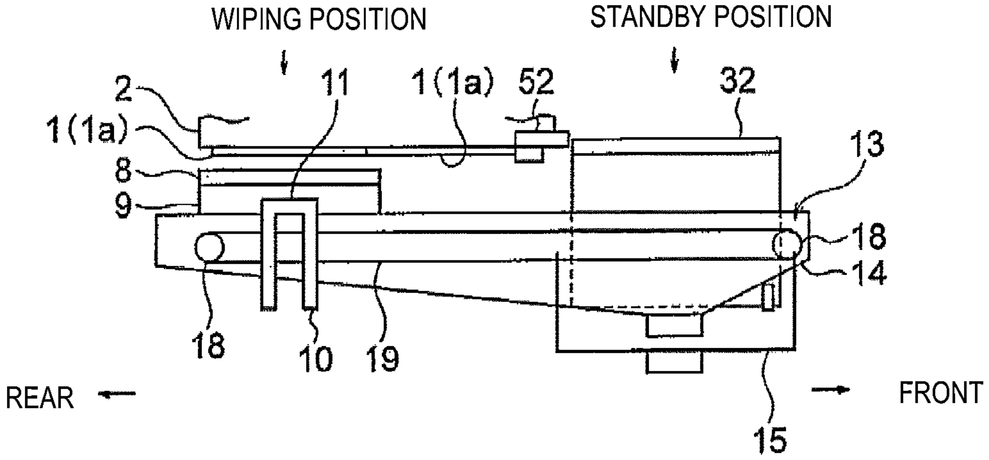

Adhering ink absorption mechanisms for wiper cleaners according to preferred embodiments of the present invention are described in detail below with reference to drawings. FIGS. 1A and 1B are schematic configuration diagrams illustrating layouts of main units of an inkjet printer mounted with the adhering ink absorption mechanism for a wiper cleaner according to the present preferred embodiment. The inkjet printer has a configuration equivalent to a configuration disclosed in, for example, Japanese Patent Laid-Open No. 2020-131609. Therefore, an entire configuration diagram is omitted. The inkjet printer includes an operation panel for a user to perform operation relating to printing, a cover covering a main body, and the like on an upper surface of a main body supported by leg portions. Further, a discharge port to discharge a medium (printing medium) is provided on a front surface of the main body, and a guide to guide the medium is provided on a lower front side of the discharge port.

In the inkjet printer, for example, a series of rolled sheet-like media is fed onto a platen, printing is performed by ejecting ink to an upper surface of the medium on the platen, and then, the medium is discharged to the guide from the discharge port. As described below, heads 1 disposed above the platen and ejecting the ink are mounted on a carriage 2, the carriage 2 reciprocates in a direction intersecting a feeding direction of the medium, and the ink is ejected from the heads 1 while the carriage 2 intersects the medium. A reciprocation (scanning) direction of the heads 1 is a main scanning direction, and the feeding direction (including opposite direction) of the medium is a sub-scanning direction. Note that the material of the medium may be a resin sheet in addition to recording paper as long as the medium has a sheet shape. Further, it is unnecessary to continuously feed the sheet-like medium, and for example, the sheet-like medium may be a sheet material singularly disposed on the platen.

Figure 2:
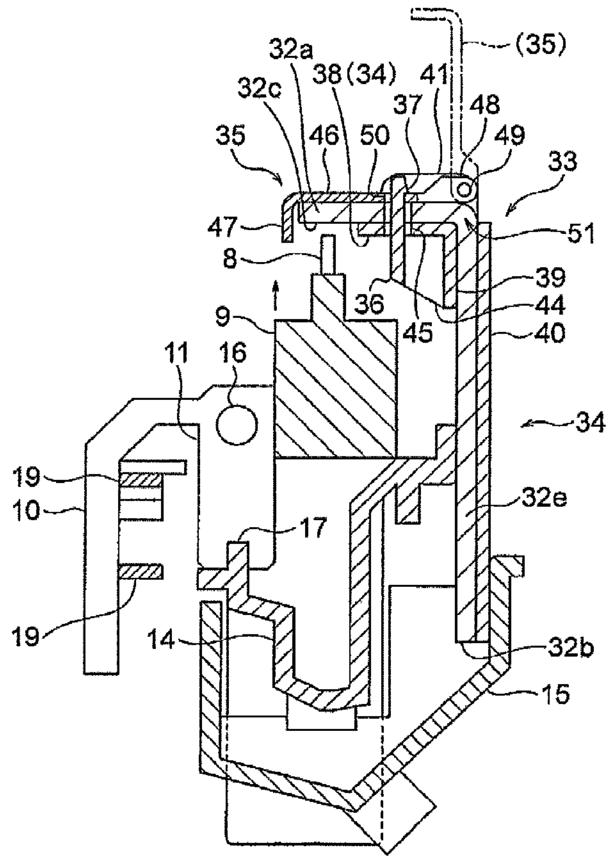
FIG. 2 is an explanatory diagram illustrating arrangement relationship between a wiper and the adhering ink absorption mechanism for a wiper cleaner in the inkjet printer in FIGS. 1A and 1B.

FIG. 1A is a plan view illustrating schematic layout of the main units of the inkjet printer, and FIG. 1B is a left side view thereof. FIG. 2 is an explanatory diagram illustrating arrangement relationship between a wiper 8 and an adhering ink absorption mechanism for a wiper cleaner 33.

In FIG. 1A, a right side is defined as a front side of the inkjet printer, and a left side is defined as a rear side of the inkjet printer. Therefore, FIG. 1B is a left side view. In the following, description is given based on these directions.

The inkjet printer according to the present preferred embodiment includes two heads 1 on a lower surface of the carriage 2. As described above, the medium is moved in the sub-scanning direction from the rear side toward the front side of the printer while the carriage 2 including the heads 1 is reciprocated in the main scanning direction, namely, in a right-left direction of the printer. During reciprocation of the heads 1 in the main scanning direction, extremely small ink droplets are ejected from each of a plurality of (a lot of) ejection ports provided on lower surfaces of the heads 1, and the ink droplets are caused to land on the upper surface of the medium, thereby performing printing. On the lower surfaces of the heads 1, portions provided with the ejection ports are referred to as ejection surfaces 1*a*. Note that positions of the heads 1 illustrated in FIG. 1A are original positions in a printer standby state, and are different from positions in printing.

The wiper 8 to wipe the ejection surfaces 1*a* of the heads 1 is held by a wiper holder 9, and the wiper holder 9 is housed in a movable ink receiving container 14 that is elongated in a front-rear direction (see FIG. 2). In a case where the ejection surfaces 1*a* of the heads 1 are wiped, the wiper 8 is fixed to a position in FIG. 1A, the heads 1 are scanned (moved) in the main scanning (right-left) direction while an upper surface (upper edge) of the wiper 8 is in contact with the ejection surfaces 1*a* of the heads 1, and accordingly the ink and the like adhering to the ejection surfaces 1*a* are wiped.

In the present preferred embodiment, the wiper 8 is made of a material having both of flexibility and strength, and has a blade shape that is elongated in the front-rear direction and thin in the right-left direction. The wiper 8 is disposed such that the upper surface (upper edge) is parallel or substantially parallel to the ejection surfaces 1*a* of the heads 1. The wiper holder 9 holding the wiper 8 is also elongated in the front-rear direction, and holds the wiper 8 such that the wiper 8 protrudes upward from a holder upper surface. As viewed from the front side, an arm base end portion 11 is integrally provided on a left side surface of the wiper holder 9, and an arm portion 10 that protrudes leftward and extends downward from the arm base end portion 11 is integrally provided.

The movable ink receiving container 14 is elongated in the front-rear direction. More specifically, the movable ink receiving container 14 communicates from a wiping position where the wiper 8 wipes the ejection surfaces 1*a* of the heads 1, namely, the position illustrated in FIG. 1A to a position where an ink absorber 32 is disposed, namely, a standby position. In the present preferred embodiment, the wiper 8 and the wiper holder 9 are reciprocated by a wiper moving mechanism 13 from the wiping position to the standby position, and the movable ink receiving container 14 communicates from the wiping position to the standby position in order to house the wiper holder 9 during the reciprocation.

Further, an upper portion of the movable ink receiving container 14 is opened to enable the reciprocation of the wiper 8 and the wiper holder 9 in a state where upper portions of the wiper 8 and the wiper holder 9 protrude upward such that a cleaning liquid dripping from a cleaning liquid nozzle 52 described below drips off onto the upper surface of the wiper 8. A guide member 16 (see FIG. 2) including a series of round bars extending in the front-rear direction is integrally provided on an upper left side of the movable ink receiving container 14 as viewed from the front side. The guide member 16 is slidably inserted into the arm base end portion 11 of the wiper holder 9, and a concave portion 17 at a lower end portion of the arm base end portion 11 engages with an upper left edge of the movable ink receiving container 14. As a result, the wiper 8 (wiper holder 9) is reciprocated in the front-rear direction while the positions of the wiper holder 9 and the wiper 8 in a vertical direction and the right-left direction relative to the movable ink receiving container 14 are regulated.

An individual fixed ink receiving container 15 is disposed below the movable ink receiving container 14 at the standby position.

In a state where the wiper 8 and the wiper holder 9 are at the standby position, the ink absorber 32 that absorbs and removes the ink adhering to the wiper 8 is disposed above the standby position (see FIG. 2). The ink absorber 32 is configured by forming a sponge made of a polyolefin resin in a flat plate shape, and is disposed so as to be deployed in a horizontal direction above the wiper 8 at the standby position in a state of being held by an adhering ink absorption mechanism for a wiper cleaner 33.

Figure 3:
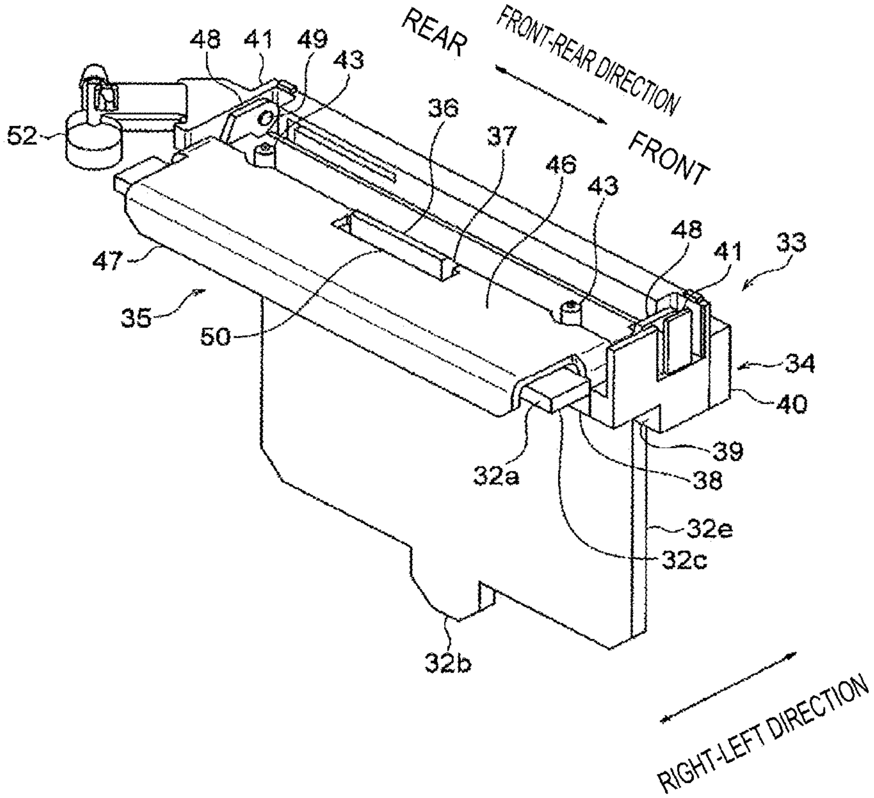
FIG. 3 is a perspective view of the adhering ink absorption mechanism for a wiper cleaner in FIG. 2.
Figure 4:
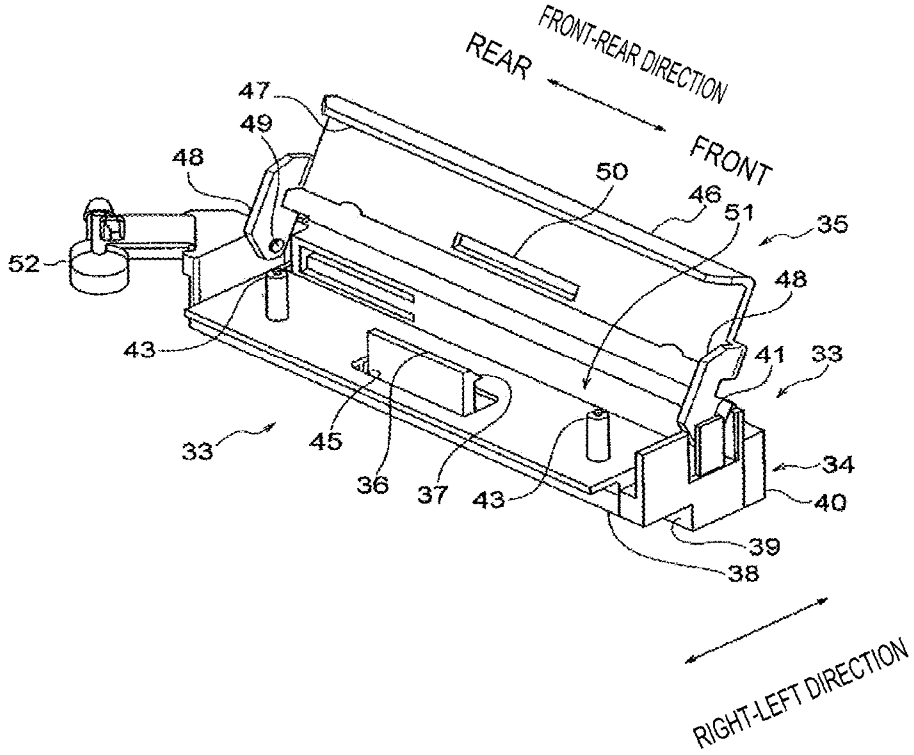
FIG. 4 is a perspective view of the adhering ink absorption mechanism for a wiper cleaner in FIG. 2, and illustrates a state where no ink absorber is held.
Figure 5:
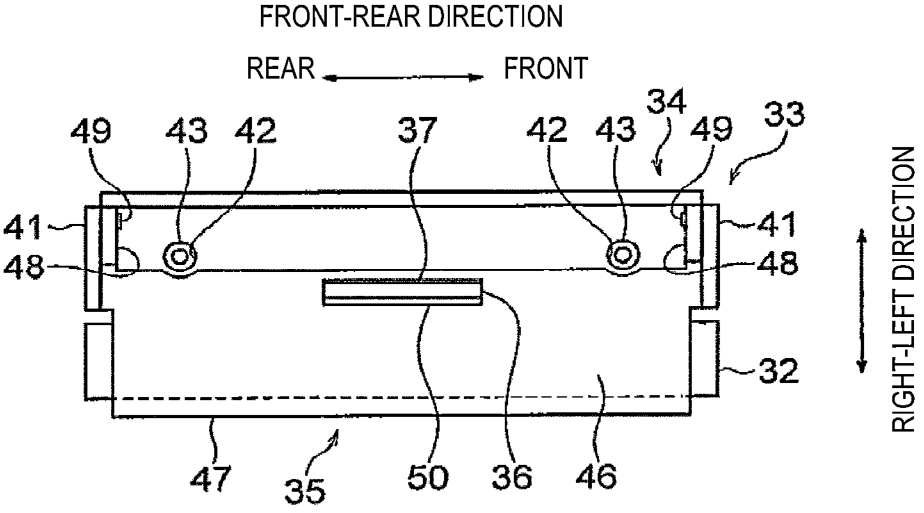
FIG. 5 is a plan view of the adhering ink absorption mechanism for a wiper cleaner in FIG. 2.
Figure 6:
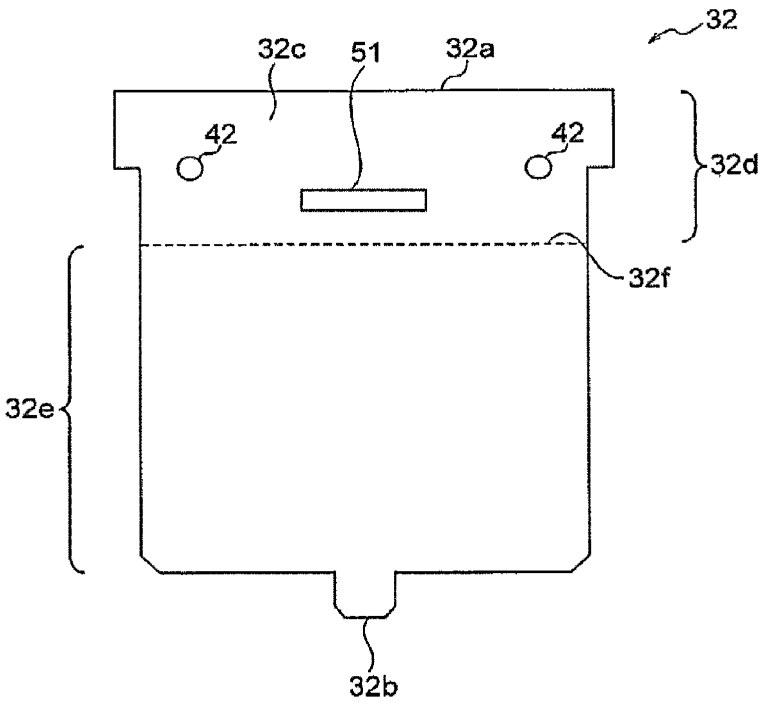
FIG. 6 is a plan view of the ink absorber of the adhering ink absorption mechanism for a wiper cleaner in FIG. 2.

FIG. 3 is a perspective view of the adhering ink absorption mechanism for a wiper cleaner 33 in a state of holding the ink absorber 32, and FIG. 4 is a perspective view of the adhering ink absorption mechanism for a wiper cleaner 33 in a state of not holding the ink absorber 32. FIG. 5 is a plan view of FIG. 3. FIG. 6 is a plan view of the ink absorber 32 held by the adhering ink absorption mechanism for a wiper cleaner 33.

The adhering ink absorption mechanism for a wiper cleaner 33 mainly includes an ink absorber supporting portion 34 supporting a lower surface (placed portion 32*d*) of one end portion 32*a* of the flat plate-shaped ink absorber 32 deployed in the horizontal direction above the wiper 8, and a lid 35 that is openably/closably attached to the ink absorber supporting portion 34 and covers, in a closed state, an upper surface of the flat plate-shaped ink absorber 32 deployed in the horizontal direction. In other words, the one end portion 32*a* (placed portion 32*d*) of the flat plate-shaped ink absorber 32 deployed in the horizontal direction above the wiper 8 is sandwiched between the ink absorber supporting portion 34 and the lid 35.

The ink absorber 32 has a flat plate shape as illustrated in FIG. 6, and is configured by, for example, a polyolefin resin sponge. Although details are described in description of each member, the ink absorber 32 includes the placed portion 32*d*, an extension region portion 32*e*, a wiper contact region 32*c*, and end portions 32*a* and 32*b*. A boundary between the placed portion 32*d* and the extension region portion 32*e* is referred to as an edge 32*f*. Hole portions 42 and an insertion hole portion 51 in a slit shape are provided in the placed portion.

As understood from FIG. 2, a lower surface of the flat plate-shaped ink absorber 32 deployed in the horizontal direction is released above the wiper 8 at the standby position. In other words, the lower surface of the ink absorber 32 is not supported by the ink absorber supporting portion 34 above the wiper 8. Accordingly, when the wiper 8 is lifted by a lifting mechanism 6 at the standby position, the upper surface (including upper edge) of the wiper 8 is brought into contact with the lower surface of the ink absorber 32 over an entire region in a longitudinal direction, and adhesion wiper ink is absorbed by the ink absorber 32 and removed.

The above-described wiper contact region 32*c* with which the wiper 8 comes into contact can be set by making a width of the lid 35 in the horizontal direction intersecting an open/close rotation shaft 49 greater than a width of the ink absorber supporting portion 34 in the horizontal direction intersecting the open/close rotation shaft 49. Accordingly, the wiper contact region 32*c* can be easily set without influencing attachment of the ink absorber 32 to the adhering ink absorption mechanism for a wiper cleaner 33.

As results of various experiments, when pressing force by the lifting mechanism 6 pressing the wiper 8 against the ink absorber 32 is set to about 3.5 N or more, for example, the wiper ink can be surely absorbed by the ink absorber 32 including the polyolefin resin sponge and removed. To receive the pressing force, the upper surface of the flat plate-shaped ink absorber 32 deployed in the horizontal direction is covered with the lid 35 made of a metal in a region where the wiper 8 is pressed from below. As described below, the lid 35 engages with a claw portion 37 of an engagement portion 36 provided on the ink absorber supporting portion 34, and is not easily detached (moved) even when the wiper 8 is pressed against the ink absorber 32 from below.

The ink absorber supporting portion 34 is integrally made of a resin material having predetermined elasticity, and mainly includes a plate-shaped supporting portion 38 supporting the lower surface of the flat plate-shaped ink absorber 32 deployed in the horizontal direction, a plate-shaped guide portion 39 extending downward from a right end portion of the supporting portion 38, a plate-shaped rear plate portion 40 separated rightward from the guide portion 39 at a predetermined interval and extending downward from the supporting portion 38 in parallel to the guide portion 39, and wall portions 41 protruding upward from both ends of the supporting portion 38 in the front-rear direction. Protruding portions 43 to be inserted into the hole portions 42 provided in the flat plate-shaped ink absorber 32 are protrusively provided at both end portions in the front-rear direction on the upper surface of the supporting portion 38.

Further, a plate-shaped engagement portion 36 that is elongated in the front-rear direction and protrudes upward is provided on a rib 44 protruding leftward from the guide portion 39 (see FIG. 2). The engagement portion 36 extends upward through a slit-shaped through hole 45 elongated in the front-rear direction, provided on the supporting portion 38, and the claw portion 37 engaging with an upper surface of the lid 35 in the closed state is protrusively provided on a right side surface of an upper end portion of the engagement portion 36.

The lid 35 is integrally made of a metal material having predetermined rigidity, and mainly includes a plate-shaped lid portion 46 that covers and presses the upper surface of the flat plate-shaped ink absorber 32 deployed in the horizontal direction, a plate-shaped handle portion 47 extending downward from a left end portion of the lid portion 46, and coupling portions 48 protruding rightward from both end portions of the lid portion 46 in the front-rear direction. The coupling portions 48 of the lid 35 are positioned on inside in the front-rear direction relative to the respective wall portions 41 of the ink absorber supporting portion 34, and the rotation shaft 49 is inserted into the coupling portions 48 and the wall portions 41 of the ink absorber supporting portion 34. Accordingly, the lid 35 is pivotable from an ink absorber sandwiching position (closed position) illustrated by a solid line in FIG. 2 to an open position illustrated by an alternate long and two short dashes line in FIG. 2, thereby being attached so as to be opened and closed relative to the ink absorber supporting portion 34.

Further, the lid 35 includes an opening portion 50 that is elongated in the front-rear direction and into which the claw portion 37 of the engagement portion 36 is insertable, at a position facing the engagement portion 36 of the ink absorber supporting portion 34 in the closed state. Accordingly, when the lid 35 in an open state pivots to the closed position and is closed while the ink absorber 32 is mounted on the supporting portion 38 of the ink absorber supporting portion 34, the claw portion 37 provided at the upper end portion of the engagement portion 36 passes through the opening portion 50 of the lid 35 while the engagement portion 36 is elastically deformed, the claw portion 37 further convers the upper surface of the lid portion 46 of the lid 35 by elastic restoring force of the engagement portion 36, and the claw portion 37 engages with the upper surface of the lid 35 to prevent the lid 35 from being opened when the wiper is pressed. Note that, to open the lid 35, the engagement portion 36 is pushed in a direction opposite to the protruding direction of the claw portion 37 to disengage the claw portion 37 from the lid 35, and hand fingers are hooked to the handle portion 47 in the state to open the lid 35.

The slit-shaped insertion hole portion 51 elongated in the front-rear direction is provided between the guide portion 39 and the rear plate portion 40 of the ink absorber supporting portion 34, and the other end portion **32*b* on a side opposite to the one end portion 32*a* of the wiper contact region 32*c* of the flat plate-shaped ink absorber 32 is inserted into the insertion hole portion 51. The end portion 32*b* on the side opposite to the wiper side of the ink absorber 32 passes through a gap between the rear plate portion 40 of the ink absorber supporting portion 34 and the movable ink receiving container 14 along the rear plate portion 40, and is further suspended down into the fixed ink receiving container 15. In other words, the extension region portion 32*e* of the ink absorber 32 is bent at the edge 32*f* of the placed portion 32*d*, and is maintained in a perpendicular state. Accordingly, the wiper ink absorbed into the ink absorber 32 in the contact region with the wiper 8, namely, at the upper left part in FIG. 2 is gradually infiltrated and dispersed inside the ink absorber 32 toward the end portion 32*b* on the opposite side, and finally reaches the end portion 32*b* on the opposite side. Accordingly, when the end portion 32*b* of the ink absorber 32 on the side opposite to the contact area with the wiper 8 is suspended down into the fixed ink receiving container 15, if the absorbed wiper ink drips from the end portion 32*b* on the opposite side, the dripping ink can be received by the fixed ink receiving container 15**, which makes it possible to prevent the dripping ink from being leaked to inside and outside of the printer.

The cleaning liquid nozzle 52 illustrated in FIGS. 1A and 1B are attached to an upper portion of the ink absorber supporting portion 34 of the adhering ink absorption mechanism for a wiper cleaner 33. The cleaning liquid nozzle 52 is provided so as to protrude obliquely left rearward from the ink absorber supporting portion 34, and a protruding front-end portion thereof is disposed so as to face the upper surface of the wiper 8 moved in the front-rear direction inside the movable ink receiving container 14. Further, a cleaning liquid is supplied to the cleaning liquid nozzle 52 through an unillustrated tube, and the cleaning liquid drips from a lower surface of the protruding front-end portion of the cleaning liquid nozzle 52. In the present preferred embodiment, the wiper 8 is normally at the standby position, and is moved toward the wiping position to wipe the ejection surfaces **1*a* of the heads 1. During the movement, the cleaning liquid drips from above by the cleaning liquid nozzle 52 while the wiper 8 is moved in the front-rear direction (in particular, rearward) in the middle of the path of the wiper 8. As a result, for example, the wiper ink not absorbed by the ink absorber 32 at a portion other than the upper surface (upper edge) of the wiper 8 can be washed away. In addition, the cleaning liquid is caused to adhere to the upper surface (upper edge) of the wiper 8, which makes it possible to surely perform next wiping of the ejection surfaces 1*a* of the heads 1. Further, the wiper ink washed away by the cleaning liquid drips/flows down into the movable ink receiving container 14**. This makes it possible to prevent the wiper ink from being leaked to the inside and the outside of the printer.

Figure 7:
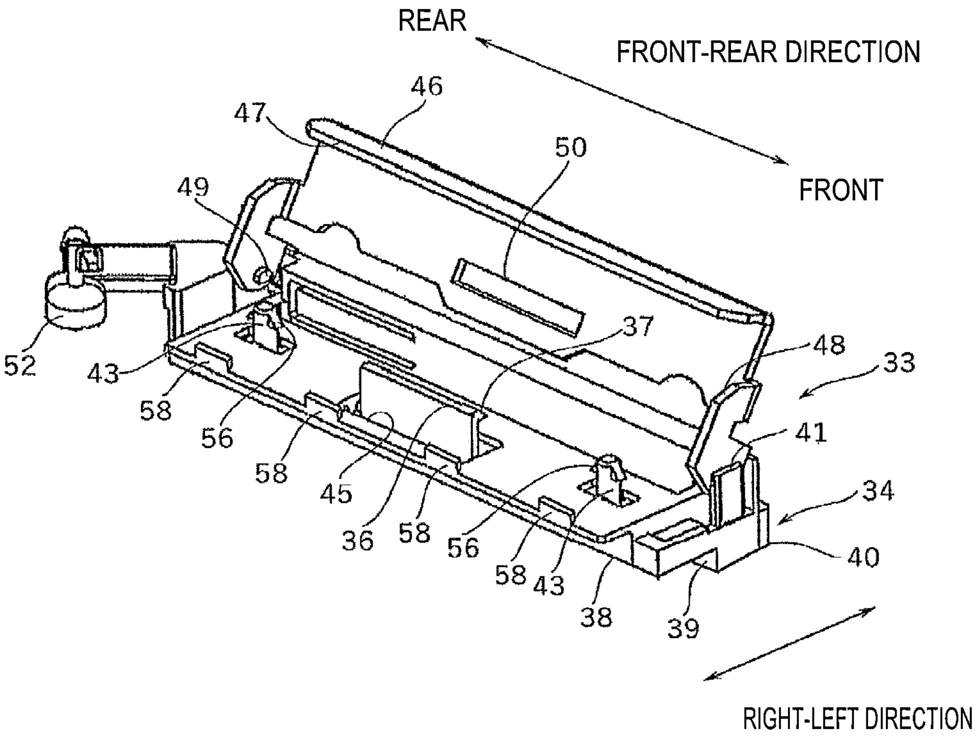
FIG. 7 is a perspective view of another preferred embodiment of the adhering ink absorption mechanism for a wiper cleaner according to the present invention, and illustrates a state where no ink absorber is held.
Figure 8:
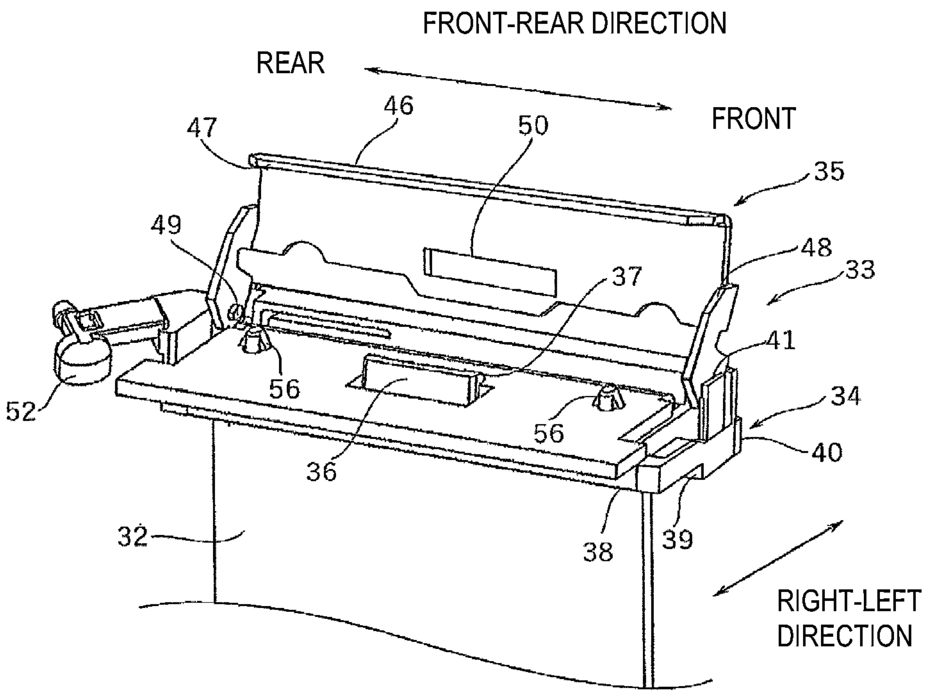
FIG. 8 illustrates a state where the ink absorber is placed and a lid is not closed in the adhering ink absorption mechanism in FIG. 7.

FIG. 7 and FIG. 8 illustrate another preferred embodiment of the adhering ink absorption mechanism for a wiper cleaner 33 according to the present invention. FIG. 7 illustrates a state where no ink absorber 32 is placed, and FIG. 8 illustrates a state where the ink absorber 32 is placed and the lid 35 is not closed. Portions having functions similar to the above-described preferred embodiments are denoted by the same reference numerals.

A difference from the adhering ink absorption mechanism for a wiper cleaner 33 according to the above-described preferred embodiments is that protruding portions 58 protruding toward the lid 35 are provided on the ink absorber supporting portion 34. In the example illustrated in FIG. 7, four protruding portions 58 are provided at an edge of the ink absorber supporting portion 34 in the right-left direction. Further, coming-off prevention claw portions 56 preventing the ink absorber 32 from coming off are provided at front ends of the protruding portions 43 that facilitate positioning of the ink absorber 32 when the ink absorber 32 is placed on the ink absorber supporting portion 34.

Accordingly, when the lid 35 in the open state pivots to the closed position and is closed while the ink absorber 32 is mounted on the supporting portion 38 of the ink absorber supporting portion 34, the ink absorber 32 is sandwiched and fixed between the protruding portions 58 of the ink absorber supporting portion 34 and the lid 35. In other words, in the above-described preferred embodiments, the ink absorber 32 is fixed while being sandwiched between the ink absorber supporting portion 34 and the lid 35, whereas in the other preferred embodiments, the ink absorber 32 is sandwiched between the protruding portions 58 of the ink absorber supporting portion 34 and the lid 35.

As a result, a contact area of the ink absorber 32 and the ink absorber supporting portion 34 is reduced. Even if a thickness of the ink absorber 32 varies, the ink absorber 32 is pressed against the lid 35 by the protruding portions 58 and is crushed when the lid 35 is closed to cause the claw portion 37 of the engagement portion 36 to engage with the upper surface of the lid portion 46 of the lid 35. Thus, the thickness of the ink absorber 32 is reduced and the lid 35 can be closed.

Further, since the four protruding portions 58 are provided at the edge of the ink absorber supporting portion 34 in the right-left direction, it is possible to surely sandwich the ink absorber 32 between the lid 35 and the protruding portions 58.

Further, in the case where the ink absorber 32 is mounted on the ink absorber supporting portion 34, the coming-off prevention claw portions 56 prevent the ink absorber from erroneously coming off in use, which makes it possible to satisfactorily use the inkjet printer.

In the adhering ink absorption mechanism for a wiper cleaner 33 according to the present preferred embodiment, the one end portion 32*a* (placed portion 32*d*) of the flat plate-shaped ink absorber 32 is sandwiched between the ink absorber supporting portion 34 and the lid 35, and the other end portion 32*b* is suspended down into the ink receiving container 15. This makes it possible to increase the volume of the ink absorber 32 and to reduce the replacement frequency of the ink absorber 32. Further, since the lid 35 is openably/closably attached to the ink absorber supporting portion 34, the ink absorber 32 is easily replaceable.

Note that the end portion 32*b* of the extension region portion 32*e* extends as far as the ink receiving container 15 provided at the lower position. Therefore, in the case where an absorption amount of the ink absorber 32 exceeds an ink absorption limit, excess ink that cannot be absorbed can be received by the ink receiving container 15, which avoid the printer main body from being contaminated by the excess ink.

The lid 35 that covers an upper region of the supported ink absorber 32 and has predetermined rigidity is provided at the upper position of the ink absorber supporting portion 34. In the case where the wiper 8 is brought into contact with the ink absorber 32 from below, the lid 35 can regulate rising of the ink absorber 32 upward. In other words, the ink absorber 32 is constantly firmly held between the ink absorber supporting portion 34 and the lid 35, and excellent ink absorption action can be maintained.

The protruding portions 58 protruding toward the lid 35 are provided on the ink absorber supporting portion 34. Therefore, when the lid 35 is closed to cause the claw portion 37 of the engagement portion 36 to engage with the upper surface of the lid portion 46 of the lid 35, the ink absorber 32 is pressed against the lid 35 by the protruding portions 58 and is crushed, and the thickness of the ink absorber 32 is reduced. As a result, the lid 35 can be closed. In other words, the ink absorber 32 is sandwiched between the protruding portions 58 and the lid 35, and the contact area of the ink absorber 32 and the ink absorber supporting portion 34 is reduced. Even if the thickness of the ink absorber 32 varies, the ink absorber 32 can be mounted.

The engagement portion 36 including the claw portion 37 is provided on the ink absorber supporting portion 34, the opening portion 50 with which the claw portion 37 can engage is provided in the lid 35, and the ink absorber 32 is sandwiched and fixed between the ink absorber supporting portion 34 and the lid 35 by engagement. As a result, the ink absorber 32 is fixed while being sandwiched between the ink absorber supporting portion 34 and the lid 35, the ink absorption action can be satisfactorily exerted. In addition, replacement of the ink absorber 32 can be easily performed by disengaging the claw portion 37 and the opening portion 50.

The protruding portions 43 protruding toward the lid 35 are provided on the ink absorber supporting portion 34, the coming-off prevention claw portions 56 preventing the placed ink absorber 32 from coming off are provided at the front ends of the protruding portions 43, and the hole portions 42 through which the protruding portions 43 penetrate and the slit-shaped insertion hole portion 51 through which the claw portion 37 provided on the ink absorber supporting portion 34 penetrates are provided in the placed portion 32*d* of the ink absorber 32. Accordingly, during replacement of the ink absorber 32 and the like, the protruding portions 43 and the claw portion 37 of the ink absorber supporting portion 34 respectively penetrate through the hole portions 42 and the slit-shaped insertion hole portion 51 of the ink absorber 32. As a result, the ink absorber 32 is easily and adequately positioned to the ink absorber supporting portion 34, and speed-up of the replacement work is realized.

Further, since the coming-off prevention claw portions 56 are provided, the ink absorber 32 is prevented from erroneously coming off in use, and the inkjet printer can be satisfactorily used.

The present invention is not limited to the above-described preferred embodiments, and various modifications can be made without departing from the gist of the present invention. For example, the configuration in which the cleaning liquid nozzle 52 is attached to the upper portion of the ink absorber supporting portion 34 of the adhering ink absorption mechanism for a wiper cleaner 33 is described. However, the configuration is not limited thereto. Further, the ink absorber 32 has not a complete rectangular shape but a shape including corners and protrusions at front ends. However, the shape of the ink absorber 32 is not limited thereto. Furthermore, the layout of the main configuration units of the inkjet printer according to the above-described preferred embodiments is illustrative, and the layout can be appropriately changed and set depending on an application and specification.

Further, the four protruding portions 58 are provided at the edge of the ink absorber supporting portion 34 in the right-left direction. However, the installation positions and the number of protruding portions 58 are not limited to those in the above-described preferred embodiments. For example, two protruding portions 58 may be provided near the protruding portions 43 of the ink absorber supporting portions 34. In addition, the installation positions and the number of protruding portions 58 can be appropriately determined based on the material and the size of the ink absorber 32.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An adhering ink absorption mechanism for a wiper cleaner, the adhering ink absorption mechanism comprising:

an ink absorber to absorb ink adhering to a wiper by being brought into contact with the wiper; and an ink absorber supporting portion to support the ink absorber at an upper position of the wiper in a state where a contact region with the wiper is released to enable the wiper to be brought into contact with the ink absorber from below by a lifting operation; wherein the ink absorber has a flat plate shape, and includes a placed portion placed on and supported by the ink absorber supporting portion, and an extension region portion bent at an edge of the placed portion and extending downward.

2. The adhering ink absorption mechanism according to claim 1, wherein the extension region portion includes a lower end portion extending as far as an ink receiving container provided at a lower position.

3. The adhering ink absorption mechanism according to claim 1, wherein a lid that covers an upper region of the supported ink absorber and has a predetermined rigidity is provided at an upper position of the ink absorber supporting portion.

4. The adhering ink absorption mechanism according to claim 3, wherein a protruding portion protruding toward the lid is provided on the ink absorber supporting portion.

5. The adhering ink absorption mechanism according to claim 4, wherein an engagement portion including a claw portion is provided on the ink absorber supporting portion, and an opening portion with which the claw portion engages is provided in the lid; and the ink absorber is sandwiched and fixed between the ink absorber supporting portion and the lid by the engagement portion.

6. The adhering ink absorption mechanism according to claim 5, wherein a protruding portion protruding toward the lid is provided on the ink absorber supporting portion, and a coming-off prevention claw portion to prevent the placed ink absorber from coming off is provided at a front end of the protruding portion; and a hole portion through which the protruding portion penetrates and a slit-shaped insertion hole portion through which the engagement portion and the claw portion provided on the ink absorber supporting portion penetrate are provided in the placed portion of the ink absorber.

* * * * *